US 8,560,020 B2

(12) United States Patent
Lee

(10) Patent No.: US 8,560,020 B2
(45) Date of Patent: Oct. 15, 2013

(54) APPARATUS AND METHOD FOR CONTROLLING A TOUCHSCREEN IN A WIRELESS TERMINAL

(75) Inventor: Byeong-Kuk Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 11/972,990

(22) Filed: Jan. 11, 2008

(65) Prior Publication Data

US 2008/0254839 A1 Oct. 16, 2008

(30) Foreign Application Priority Data

Apr. 10, 2007 (KR) .................. 10-2007-0035153
Oct. 18, 2007 (KR) .................. 10-2007-0105286

(51) Int. Cl.
*H04M 1/00* (2006.01)
*H04B 1/38* (2006.01)
(52) U.S. Cl.
USPC .............. 455/566; 455/575.3; 455/575.4
(58) Field of Classification Search
USPC ......... 455/550.1, 566, 575.3, 575.4; 345/173, 345/1.1
See application file for complete search history.

(56) References Cited

U.S. PATENT DOCUMENTS

| | | | |
|---|---|---|---|
| 7,194,085 B2* | 3/2007 | Yamazaki et al. | 379/433.07 |
| 7,231,230 B2 | 6/2007 | Yoshikawa | |
| 7,423,557 B2 | 9/2008 | Kang | |
| 7,636,587 B2* | 12/2009 | Yoo | 455/566 |
| 8,019,389 B2* | 9/2011 | Kim et al. | 455/566 |
| 2002/0022503 A1* | 2/2002 | Lee | 455/566 |
| 2005/0054397 A1* | 3/2005 | Kim et al. | 455/575.4 |
| 2005/0083642 A1 | 4/2005 | Senpuku et al. | |
| 2006/0035680 A1* | 2/2006 | Kokubo | 455/566 |
| 2006/0063570 A1* | 3/2006 | Nishimura | 455/575.3 |
| 2007/0129099 A1* | 6/2007 | Lee | 455/550.1 |
| 2007/0217132 A1* | 9/2007 | Collins | 361/681 |
| 2007/0249389 A1* | 10/2007 | Hotta | 455/552.1 |
| 2008/0195961 A1* | 8/2008 | Bae et al. | 715/769 |
| 2011/0273366 A1* | 11/2011 | Yamazaki et al. | 345/76 |

FOREIGN PATENT DOCUMENTS

| | | |
|---|---|---|
| EP | 1 427 173 A1 | 6/2004 |
| EP | 1 549 067 A2 | 6/2005 |
| EP | 1 635 550 A1 | 3/2006 |
| GB | 2 402 105 A | 12/2004 |
| JP | 2002-368840 A | 12/2002 |
| KR | 10-2006-0089823 A | 8/2006 |
| KR | 10-2006-0118640 A | 11/2006 |
| WO | 03/103177 A1 | 12/2003 |

* cited by examiner

*Primary Examiner* — Christian Hannon
(74) *Attorney, Agent, or Firm* — Jefferson IP Law, LLP

(57) ABSTRACT

An apparatus and method for controlling a touchscreen in a wireless terminal are provided. The apparatus includes a display unit which is activated when the wireless terminal is in a first operation state, a touchscreen unit which is activated and displays an icon for performing a corresponding function at a current mode when the wireless terminal is in the first operation state, and a control unit which activates the display unit and controls the icon for performing a corresponding function at a current mode to be displayed on the touchscreen unit when the wireless terminal is in the first operation state. The method includes activating a display unit and displaying an icon for performing a corresponding function at a current mode on a touchscreen unit when the wireless terminal is in a first operation state, and deactivating the display unit and converting a function of the touchscreen unit into a function of the display unit or activating the display unit when the wireless terminal is in a second operation state contrary to the first operation state.

23 Claims, 16 Drawing Sheets

APPARATUS AND METHOD FOR CONTROLLING A TOUCHSCREEN IN A WIRELESS TERMINAL

PRIORITY

This application claims the benefit under 35 U.S.C. §119 (a) of a Korean patent application filed in the Korean Industrial Property Office on Apr. 10, 2007 and assigned Serial No. 2007-35153, and of a Korean patent application on Oct. 18, 2007 and assigned Serial No. 2007-105286, the entire disclosures of both of which are hereby incorporated by reference.

BACKGROUND OF THE INVENTION

1. Field of the Invention

The present invention relates to an apparatus and method for controlling a touchscreen in a wireless terminal. More particularly the present invention relates to an apparatus and method for controlling a function of a touchscreen according to an operation state of a wireless terminal.

2. Description of the Related Art

Generally, the term "wireless terminal" refers to an apparatus that provides a function of communication or data exchange during movement of a user. The term includes a cellular phone, a Personal Digital Assistant (PDA), a Personal Communication Services (PCS) Phone, an International Mobile Telecommunication-2000 (IMT-2000) terminal, a Global System for Mobile Communication (GSM) terminal, and the like.

Such wireless terminals have become popular to many people regardless of age or gender, and have been regarded as a necessity to be carried at all times.

Meanwhile, with advances in technology, wireless terminals that provide a high rate of data transmission as well as voice communication are now available. Furthermore, wireless terminals can now display a motion picture signal by adding a camera or a TV receiver to the wireless terminal. That is, the wireless terminals including a camera can photograph an image and display the photographed image as a motion picture or a still image. The wireless terminals including a TV receiver can also display a received image signal.

Recently, wireless terminals have been provided with a key input unit as well as a touchscreen unit. The touchscreen unit allows a user to perform a corresponding function through a simple touch on the touchscreen unit.

However, the touchscreen included in a conventional wireless terminal only allows execution of corresponding functions by touching. That is, the conventional touchscreen cannot perform other functions. Also, with a conventional touchscreen, it is not possible to differently set and display an icon displayed for indicating a corresponding function according to a current mode. Therefore, users of a wireless terminal equipped with a conventional touchscreen suffer an inconvenience.

SUMMARY OF THE INVENTION

An aspect of the present invention is to address the above-mentioned problems and/or disadvantages and to provide at least the advantages described below. Accordingly, an aspect of the present invention is to provide an apparatus and method for controlling a touchscreen function of a wireless terminal according to an operation state of the terminal.

In accordance with an aspect of the present invention, an apparatus for controlling a touchscreen in a wireless terminal is provided. The apparatus includes a display unit which is activated when the wireless terminal is in a first operation state, a touchscreen unit which is activated and displays an icon for performing a corresponding function at a current mode when the wireless terminal is in the first operation state, and a control unit which activates the display unit and controls the icon for performing a corresponding function at a current mode to be displayed on the touchscreen unit when the wireless terminal is in the first operation state.

In accordance with another aspect of the present invention, a method for controlling a touchscreen in a slide-type wireless terminal is provided. The method includes activating a display unit and displaying an icon for performing a corresponding function at a current mode on a touchscreen unit when the wireless terminal is in a first operation state, and deactivating the display unit and converting a function of the touchscreen unit into a function of the display unit or activating the display unit when the wireless terminal is in a second operation state contrary to the first operation state.

In accordance with another aspect of the present invention, a method for controlling a touchscreen in a slide-type wireless terminal is provided. The method includes deactivating the display unit and converting a function of a touchscreen unit into a function of the display unit when the wireless terminal is in a slide-down state, and activating the display unit and displaying an icon for performing a corresponding function at a current mode when the wireless terminal in a slide-up state.

In accordance with another aspect of the present invention, a method for controlling a touchscreen in a folder-type wireless terminal is provided. The method includes activating an external display unit when the wireless terminal is in a folder-close state, and activating an internal display unit and displaying an icon for performing a corresponding function at a current mode on the touchscreen unit when the wireless terminal is in a folder-open state.

In accordance with another aspect of the present invention, a method for controlling a touchscreen in a bar-type wireless terminal is provided. The method includes determining whether a predetermined key is input to the wireless terminal, and a control unit controlling a display unit to be activated and an icon for performing a corresponding function at a current mode to be displayed on a touchscreen unit when the predetermined key is input.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
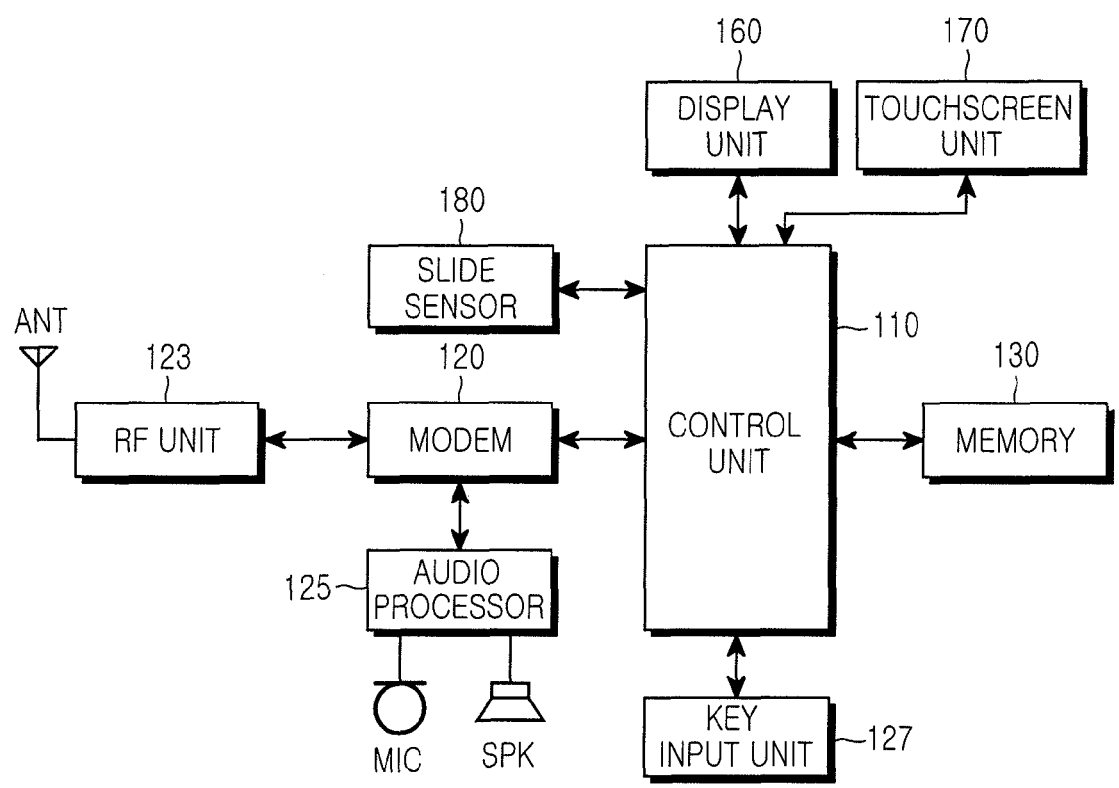
FIG. 1 is a view illustrating a configuration of a slide-type wireless terminal according to a first exemplary embodiment of the present invention.

FIG. 1 is a view illustrating a configuration of a slide-type wireless terminal according to a first exemplary embodiment of the present invention. In the first exemplary embodiment of the present invention, a slide-up state of the wireless terminal represents a first operation state out of operation states of the wireless terminal, and a slide-down state represents a second operation state contrary to the first operation state out of operation states of the wireless terminal.

Referring to FIG. 1, an RF unit 123 performs a wireless communication function of the wireless terminal. The RF unit 123 includes an RF transmitter for up-converting and amplifying a frequency of a signal to be transmitted, and an RF receiver for low-noise amplifying a received signal and down-converting a frequency of the low-noise amplified signal. A modem 120 includes a transmitter for encoding and modulating a signal to be transmitted, and a receiver for decoding and demodulating the received signal.

An audio processor 125 is provided to configure a codec. The codec includes a data codec for processing a packet data and the like, and an audio codec for processing an audio signal such as voice and the like. The audio processor 125 converts a digital audio signal received from the modem 120 into an analog signal through the audio codec and reproduces the analog signal to be played through a speaker. The audio processor 125 also converts the analog audio signal generated and transmitted from a microphone into a digital audio signal through the audio codec, and then transmits the digital audio signal to the modem 120. The codec can be separately equipped or included in a control unit 110.

A memory 130 may include a program memory and a data memory. The program memory can store both programs for controlling a general operation of the wireless terminal and programs for controlling a touchscreen function based on a slide state of the wireless terminal according to an exemplary embodiment of the present invention. The data memory also temporarily stores data generated during performance of the programs.

The control unit 110 performs a function of controlling general operations of the wireless terminal. Also, the control unit 110 may include the modem 120 and the codec.

When the wireless terminal according to the first exemplary embodiment of the present invention is in a slide-down state in a stand-by mode, the control unit 110 deactivates the display function of a display unit 160 and a touchscreen function of touchscreen unit 170, and then converts the function of the touchscreen unit 170 into the function of the display unit.

If an event occurs when the wireless terminal is in a slide-down state according to the first exemplary embodiment of the present invention, the control unit 110 controls an icon corresponding to the type of the occurred event to be displayed on the touchscreen 170 at a full screen size. The event includes generation of an alarm, generation of a wake-up call, a message reception, a wireless terminal charge, and the like.

When the wireless terminal is in a slide-up state according to the first exemplary embodiment of the present invention and in a stand-by mode, the control unit 110 activates the display function of the display unit 160 and the touchscreen function of the touchscreen unit 170. The control unit 110 then controls an icon for performing a corresponding function at the stand-by mode to be displayed on the touchscreen unit 170. In this case, the icon, which is displayed on the touchscreen 170, for performing the corresponding function at the stand-by mode, may be set by default or set by a user.

When the wireless terminal is in the slide-up state at a specific mode for execution of a corresponding function according to the first exemplary embodiment of the present invention, the control unit 110 also activates the display function of the display unit 160 and the touchscreen function of the touchscreen unit 170. The control unit 110 also controls an icon for performing a corresponding function at the specific mode to be displayed. In this case, the icon, which is displayed on the touchscreen 170, for performing the corresponding function at the specific mode, may be set by default or set by a user.

When an event occurs under a condition that the wireless terminal is in a slide-up state according to the first exemplary embodiment of the present invention, the control unit 110 controls an icon, corresponding to the type of the occurred event to be displayed on at least one of the display unit 160 and the touchscreen 170 at a full screen size.

The display unit 160 is provided at an up-down sliding upper body of the wireless terminal and displays user data output from the control unit 110. According to the first exemplary embodiment of the present invention, the display unit 160 is deactivated when the wireless terminal is in a slide-down state, and is activated when the wireless terminal is in a slide-up state so that it displays a current mode when the corresponding function is performed.

The touchscreen unit 170 is provided at an up-down sliding upper body of the wireless terminal. According to the first exemplary embodiment of the present invention, when the wireless terminal is in a slide-down state, the touchscreen function of the touchscreen unit 170 is deactivated, and then the touchscreen unit 170 performs a display function. When the wireless terminal is in a slide-up state, the touchscreen function of the touchscreen unit 170 is activated, and then the touchscreen unit 170 displays an icon for performing a corresponding function at a current mode.

A slide sensor 180 detects a slide-up state and a slide-down state of the wireless terminal, and transmits corresponding signals of the detected state to the control unit 110.

A key input unit 127 includes keys for inputting number and character information, function keys for setting various functions and the like.

An operation of controlling a function of the touchscreen according to a slide state of the slide-type wireless terminal will be described in greater detail with reference to FIG. 2, and FIG. 3A to 3C.

Figure 2:
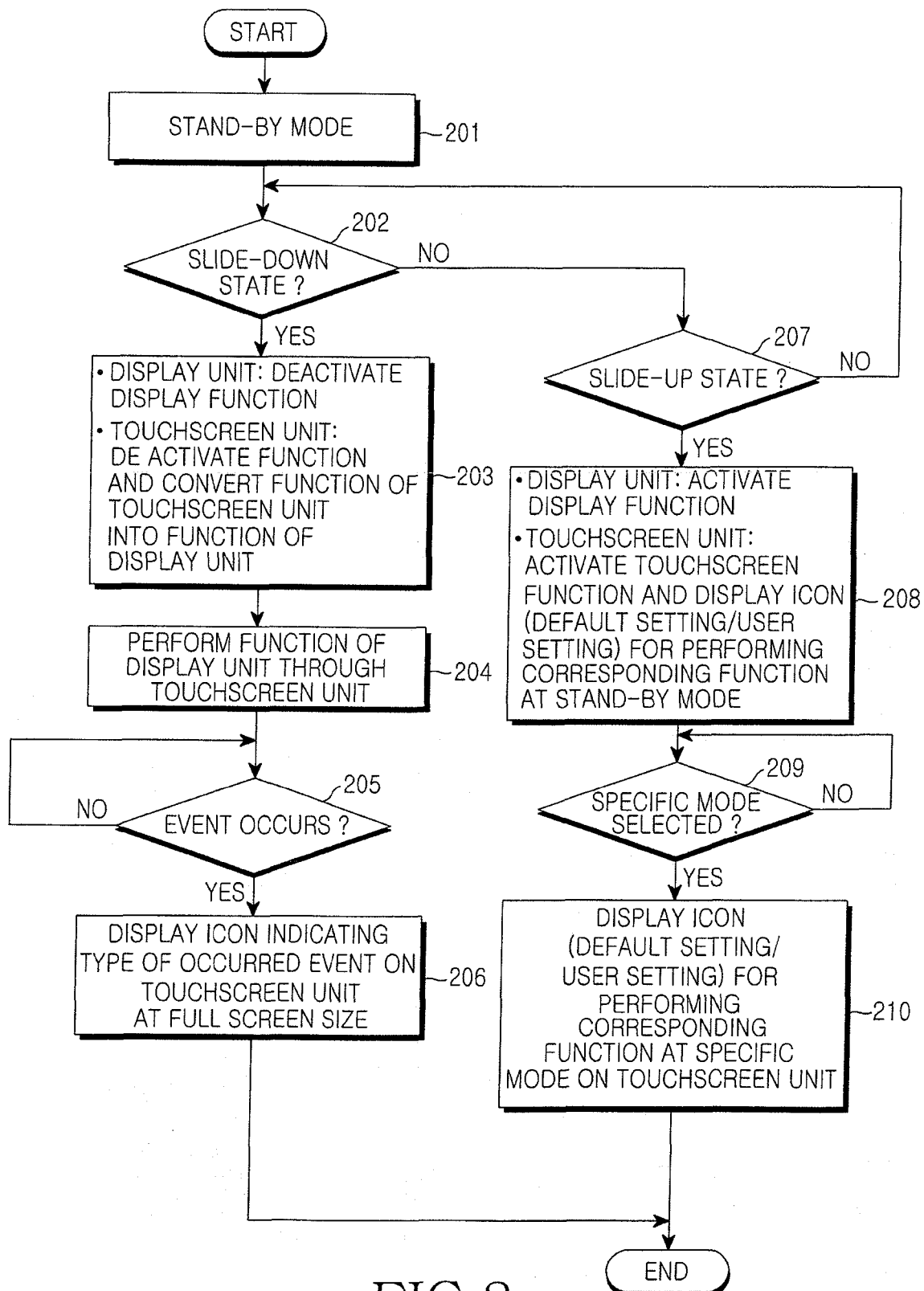
FIG. 2 is a flowchart illustrating a process of controlling a touchscreen in a slide-type wireless terminal according to the first exemplary embodiment of the present invention.
Figure 3A:
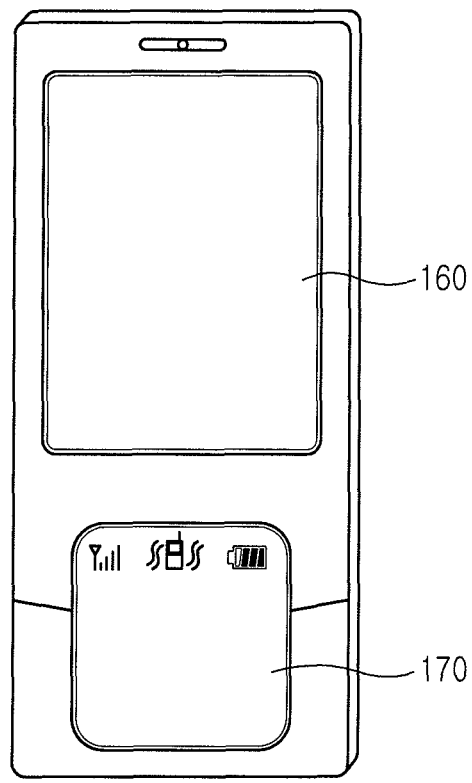
FIGS. 3A to 3C are views for describing the process shown in FIG. 2.
Figure 3B:
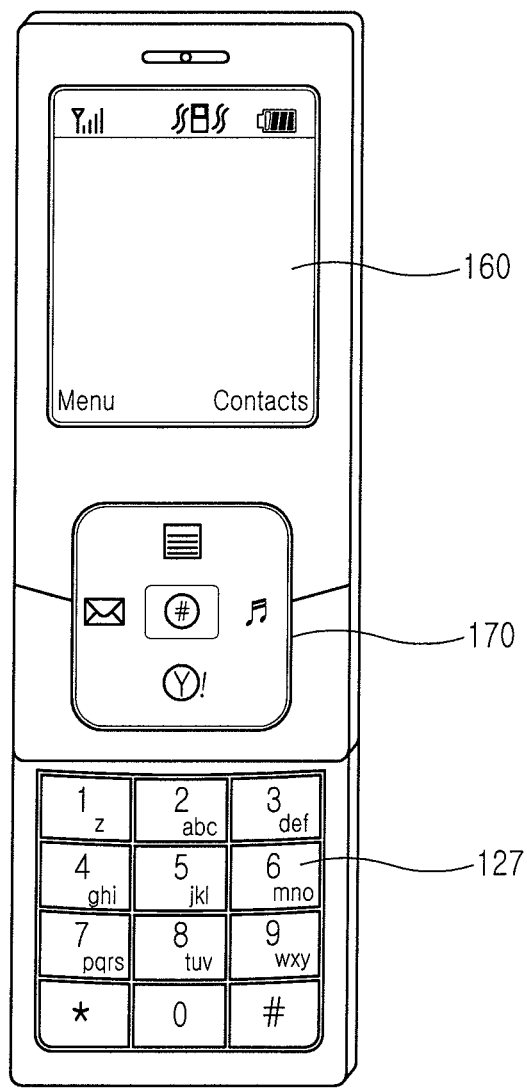
Figure 3C:
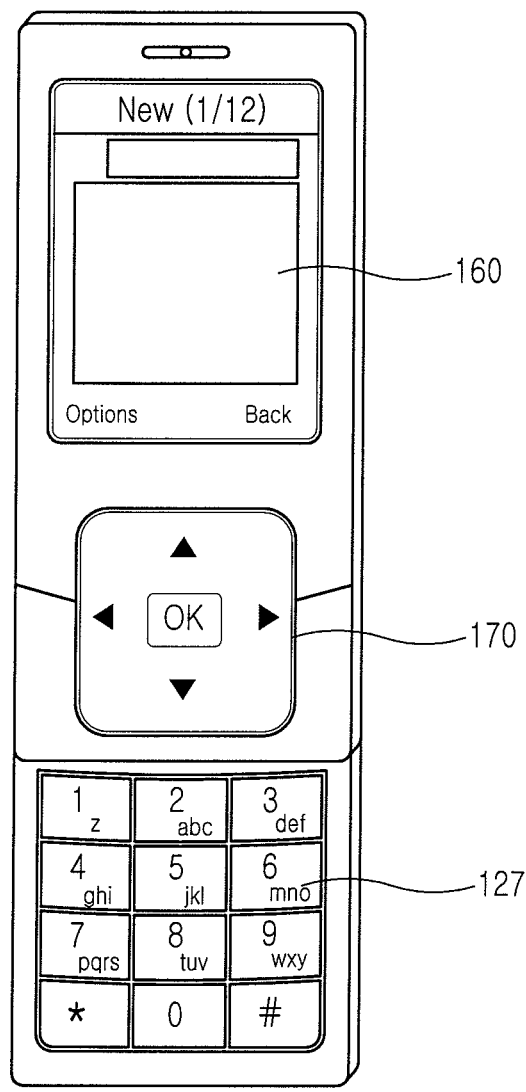

FIG. 2 illustrates a flowchart of a process of controlling a touchscreen according to a slide state of a slide-type wireless terminal according to a first exemplary embodiment of the present invention, and FIGS. 3A to 3C are views for describing the process shown in FIG. 2. FIGS. 10A to 10G are views illustrating icons displayed according to a current mode on the touchscreen unit of the wireless terminal based on the first exemplary embodiment of the present invention. FIGS. 11A to 11C are views illustrating icons indicating a type of occurred event in the wireless terminal according to the first exemplary embodiment of the present invention.

Hereinafter, the first exemplary embodiment of the present invention will be described in greater detail with reference to FIG. 1.

Referring to FIG. 2, when the wireless terminal is in a slide-down state in step 201, i.e., a stand-by mode of the wireless terminal, the slide sensor 180 detects a slide state of the wireless terminal, and then outputs a corresponding signal, which informs a user of the slide-down state of the wireless terminal, to the control unit 110.

When the corresponding signal indicating the slide-down state of the wireless terminal is received from the slide sensor 180, the control unit 110 detects the reception of the corresponding signal in step 202. Then, as shown in FIG. 3A, the control unit 110 proceeds to step 203 where it deactivates the display function of the display unit 160, deactivates the touchscreen function of the touchscreen unit 170, and converts the function of the touchscreen unit 170 into the function of the display unit.

When the function of the touchscreen unit 170 is converted into the function of the display unit in step 203, the control unit 110 controls the touchscreen unit 170 to perform a conventional function of a sub-display unit in step 204.

In step 204, the control unit 110 controls a basic icon or a setting icon such as a wake-up call, an alarm and the like, which are displayed at a stand-by mode of the wireless terminal, to be displayed on the touchscreen unit 170 performing the function of the display unit. When a call is generated or data is received, the control unit 110 controls the call or the received data to be displayed through the touchscreen unit 170 performing the function of the display unit.

When an event, for example, a message reception, generation of an alarm or a wireless terminal charge, occurs in step 204, the control unit 110 detects the event in step 205. The control unit proceeds to step 206 to display an icon indicating the type of the occurred event on the touchscreen unit 170 at a full screen size. The icon displayed in step 206 can be displayed for a period of time, until a user manipulates the icon, or until the event is completed.

In FIGS. 11A to 11C above, an icon indicating message reception at a full screen size in step 206 is shown in FIG. 11A. An icon indicating generation of an alarm at a full screen size in step 206 is shown in FIG. 11B. An icon indicating a wireless terminal charge at a full screen size in step 206 is shown in FIG. 11C.

Referring again to step 202 of FIG. 2, when the wireless terminal is in a slide-up state, the slide sensor 180 detects a slide-up state of the wireless terminal and then outputs a corresponding signal informing the slide-up state of the wireless terminal to the control unit 110.

When the corresponding signal informing the slide-up state of the wireless terminal is received from the slide sensor 180, the control unit 110 detects the reception of the corresponding signal in step 207. The control unit 110 proceeds to step 208 to activate the display function of the display unit 160, to activate the touchscreen function of the touchscreen unit 170 and to control an icon for performing a corresponding function at the stand-by mode to be displayed on the touchscreen unit 170 as shown in FIG. 3B.

In step 208, when the icon is determined to have been set by a user, the control unit 110 controls a stand-by mode icon set by the user to be displayed on the touchscreen unit 170. When the icon is determined to have not been set by a user, the control unit 110 controls a stand-by mode icon set as a default icon to be displayed on the touchscreen unit 170.

In step 208, the control unit 110 controls the display unit 160 to display either the function performed in correspondence to a touch on the corresponding icon displayed on the touchscreen unit 170 or the function performed in correspondence to the key input from the key input unit 127.

In step 209, the control unit 110 determines if a specific mode is selected through the icon of the touchscreen unit 170 or the key from the key input unit 127. Then, in step 210, the control unit 110 converts the mode of the wireless terminal into a specific mode, and controls an icon for performing a corresponding function in the specific mode to be displayed on the touchscreen unit 170.

In step 210, when the icon is determined to have been set by a user, the control unit 110 controls a specific mode icon set by the user to be displayed on the touchscreen 170. When the icon is determined to have not been set by a user, the control unit 110 controls a specific mode icon set as a default icon to be displayed on the touchscreen 170.

FIG. 3C illustrates a specific mode such as a character input mode. In this case, the touchscreen unit 170 displays an icon for performing a corresponding function at the character input mode. The icon displayed on the touchscreen unit 170 at the character input mode may be changed into an icon set by a user and displayed.

Otherwise, when a mode of the wireless terminal is converted into a specific mode, such as an MP3 mode, the touchscreen unit 170 can display icons, such as a fast forward icon, a rewind icon, a pause icon and a stop icon and the like. The icons may be displayed by a basic setting or by a user setting for performing corresponding functions at the MP3 mode.

Figure 10A:
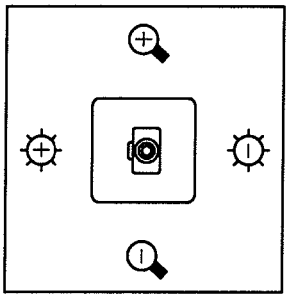
FIGS. 10A to 10G are views illustrating icons displayed according to a current mode on the touchscreen unit of the wireless terminal based on the first to third exemplary embodiments of the present invention.
Figure 10B:
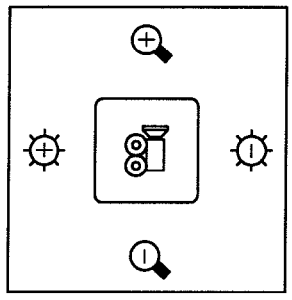
Figure 10C:
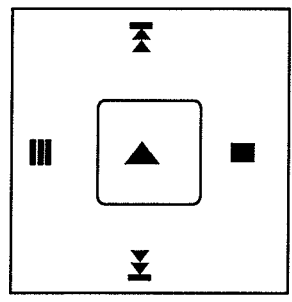
Figure 10D:
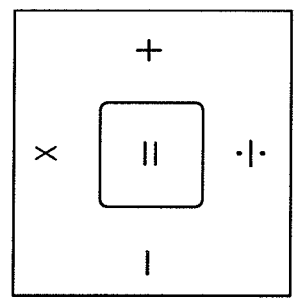

In FIGS. 10A to 10G above, when the mode of the wireless terminal corresponds to a photographing mode, an icon displayed on the touchscreen unit 170 in step 210 is shown in FIG. 10A. When the mode of the wireless terminal corresponds to a moving picture photographing mode, an icon displayed on the touchscreen unit 170 in step 210 is shown in FIG. 10B. When the mode of the wireless terminal corresponds to an MP3 playing mode, an icon displayed on the touchscreen unit 170 in step 210 is shown in FIG. 10C. When the mode of the wireless terminal corresponds to a calculator mode, an icon displayed on the touchscreen unit 170 in step 210 is shown in FIG. 10D.

Figure 10E:
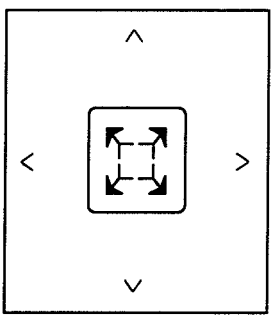
Figure 10F:
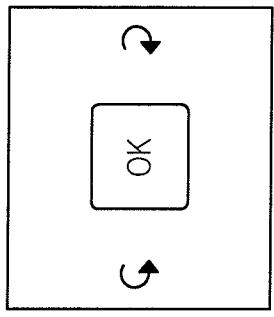
Figure 10G:
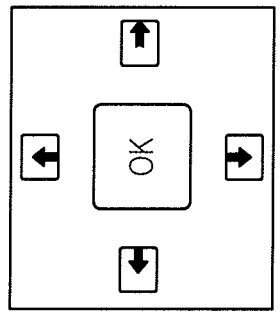
Figure 10G:
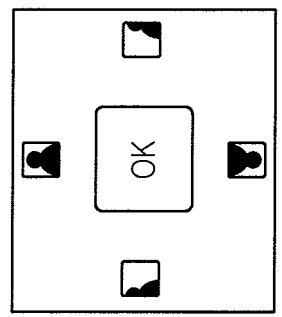
Figure 10G:
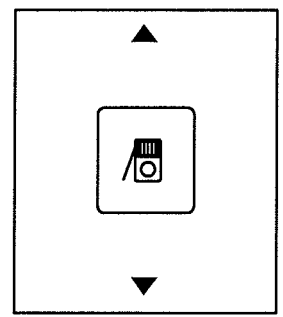
Figure 11A:
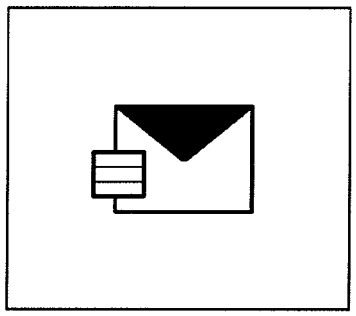
FIGS. 11A to 11C are views illustrating icons indicating the type of occurred event in the wireless terminal according to the first to third exemplary embodiments of the present invention.
Figure 11B:
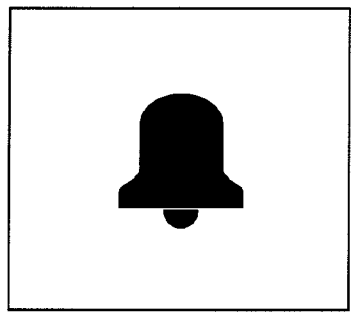
Figure 11C:
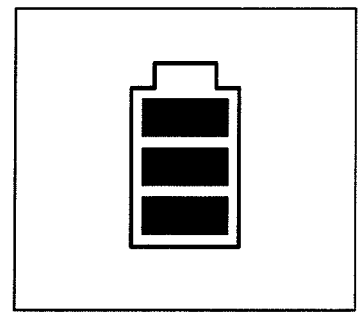

In FIGS. 10A to 10G above, when the mode of the wireless terminal corresponds to a file view mode, an icon displayed on the touchscreen unit 170 in step 210 is shown in FIG. 10E. When the mode of the wireless terminal corresponds to an image editing mode, an icon displayed on the touchscreen unit 170 according to the editing function selected in step 210 is shown in FIG. 10F. When the mode of the wireless terminal corresponds to an FM radio mode, an icon displayed on the touchscreen unit 170 in step 210 is shown in FIG. 10G.

When an event, such as a message reception, generation of an alarm or a wireless terminal charge, occurs in step 210, the control unit 110 detects the event and controls an icon indicating the type of the occurred event to be displayed on at least one of the display unit 160 and the touchscreen 170 at a full screen size as described above with reference to FIGS. 11A to 11C. The icon displayed on at least one of the display unit 160 and the touchscreen 170 can be displayed for a period of time, until a user manipulates the icon, or until the event is completed.

Figure 4:
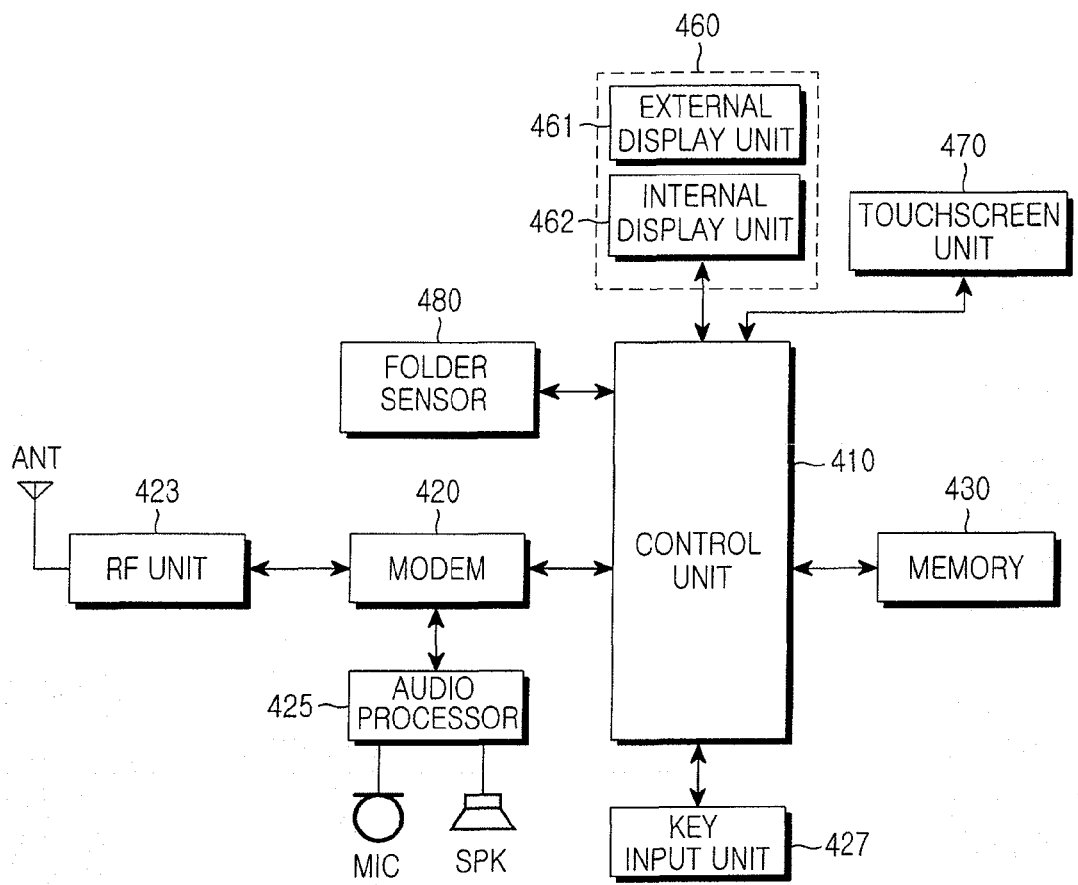
FIG. 4 is a view illustrating a configuration of a folder-type wireless terminal according to a second exemplary embodiment of the present invention.

FIG. 4 illustrates a configuration of a folder-type wireless terminal according to a second exemplary embodiment of the present invention.

In the second exemplary embodiment of the present invention, a folder-open state of the wireless terminal represents a first operation state out of operation states of the wireless terminal, and a folder-close state of the wireless terminal represents a second operation state contrary to the first operation state out of operation states of the wireless terminal.

Referring to FIG. 4, an RF unit 423, a modem 420 and an audio processor 425 all perform substantially the same respective operations as those of the RF unit 123, the modem 120 and the audio processor 125 in FIG. 1.

A memory 430 may include a program memory and a data memory. The program memory can store programs for controlling general operations of the wireless terminal and programs for controlling the function of the touchscreen according to an opened and closed state of the wireless terminal and the current mode of the wireless terminal based on the second exemplary embodiment of the present invention. The data memory performs a function of temporarily storing data generated during performance of the programs.

A control unit 410 performs a function of controlling general operations of the wireless terminal, and may include the modem 420 and a codec.

When the wireless terminal is in a folder-close state according to the second exemplary embodiment of the present invention, the control unit 410 controls the display function of an external display unit 461 to be activated.

When an event occurs under the condition that the wireless terminal is in a folder-close state according to the second exemplary embodiment of the present invention, the control unit 410 controls an icon, corresponding to the type of the occurred event to be displayed on the external display unit 461 at a full screen size. The event may include the generation of an alarm, generation of a wake-up call, a message reception, a wireless terminal charge and the like.

When the wireless terminal is in a folder-open state at a stand-by mode according to the second exemplary embodiment of the present invention, the control unit 410 activates the display function of an internal display unit 462 and the touchscreen function of the touchscreen unit 470. The control unit 410 also controls an icon for performing a corresponding function at a current mode to be displayed on the touchscreen unit 470. In this case, the icon, which is displayed on the touchscreen 470, for performing the corresponding function at the stand-by mode, may be set by default or set by a user.

When the wireless terminal is in the folder-open state at a specific mode for execution of a corresponding function according to the second exemplary embodiment of the present invention, the control unit 410 also activates the display function of the internal display unit 462 and the touchscreen function of the touchscreen unit 470. The controller 410 also controls an icon for performing a corresponding function at the specific mode to be displayed. In this case, the icon, which is displayed on the touchscreen unit 470, for performing the corresponding function at the specific mode may be set by default or set by a user.

When an event occurs under the condition that he wireless terminal is in the folder-open state according to the second exemplary embodiment of the present invention, the control unit 410 controls an icon indicating the type of the occurred event to be displayed on at least one of the internal display unit 462 and the touchscreen unit 470 at a full screen size.

A display unit 460 includes an external display unit 461 provided at the outside of the folding body of a wireless terminal. The folding body is provided for performing opening/closing operations in correspondence to the main body of the wireless terminal. The display unit 460 also includes an internal display unit 462 provided at the inside of the folding body of the wireless terminal. The display unit 460 displays user data output from the control unit 410. When the wireless terminal is in the folder-close state according to the second exemplary embodiment of the present invention, the external display unit 461 is activated. When the wireless terminal is in the folder-open state, the internal display unit 462 is activated such that the current mode is displayed. Additionally, the external display unit 461 may be implemented in the manner of a touchscreen.

The touchscreen unit 470 is disposed on the main body of the wireless terminal. When the wireless terminal is in the folder-open state according to the second exemplary embodiment of the present invention, the touchscreen function of the touchscreen unit 470 is activated such that the touchscreen unit 470 displays an icon for performing a corresponding function at a current mode.

A folder sensor 480 detects a state of the folder of the wireless terminal and transmits a folder state signal to the control unit 410.

A key input unit 427 includes keys for inputting numbers and characters information and keys for setting various functions.

Operations for controlling functions of the touchscreen in such a folder-type wireless terminal will be described with reference to FIG. 5, 6, 10A to 10G and 11A to 11C in greater detail below.

Figure 5:
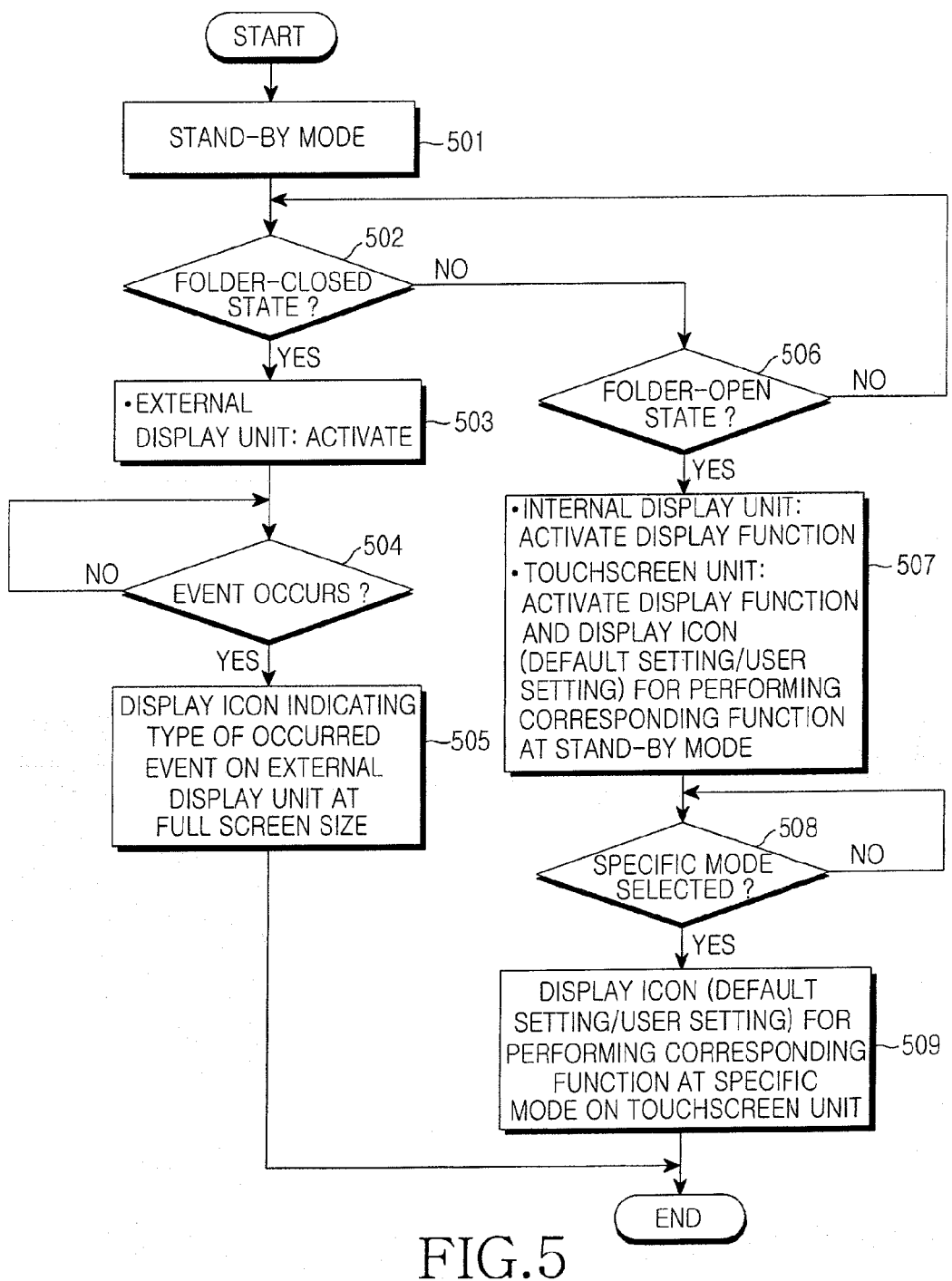
FIG. 5 is a flowchart illustrating a process of controlling a touchscreen in a folder-type wireless terminal according to the second exemplary embodiment of the present invention.
Figure 6A:
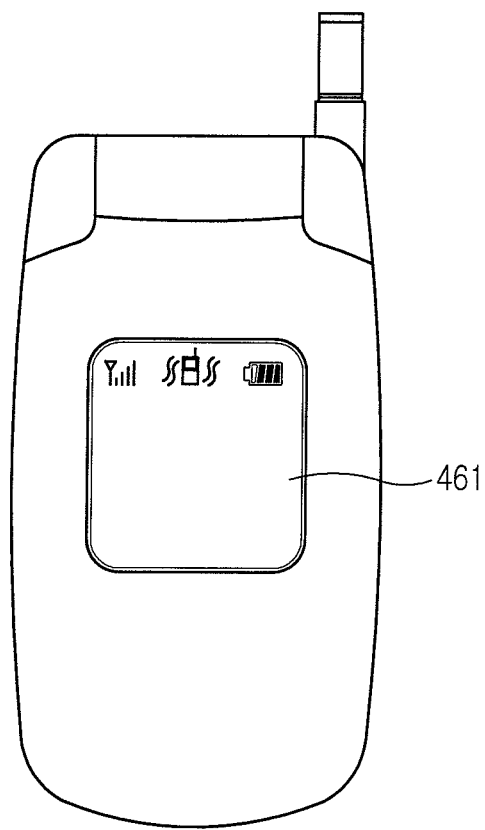
FIGS. 6A to 6C are views for describing the process shown in FIG. 5.
Figure 6B:
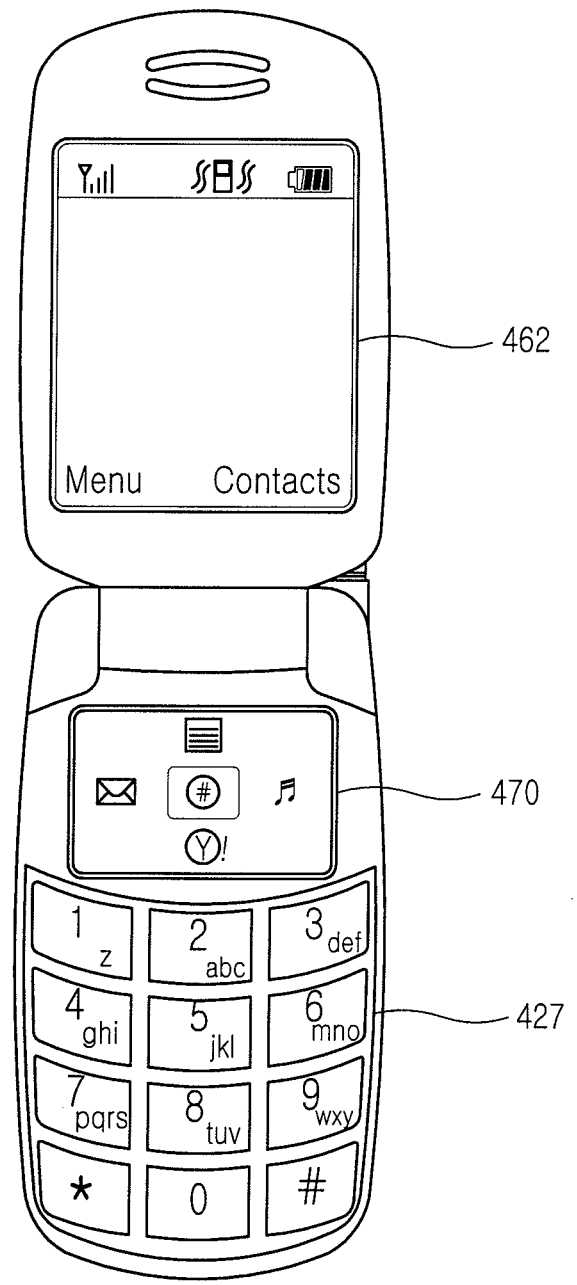
Figure 6C:
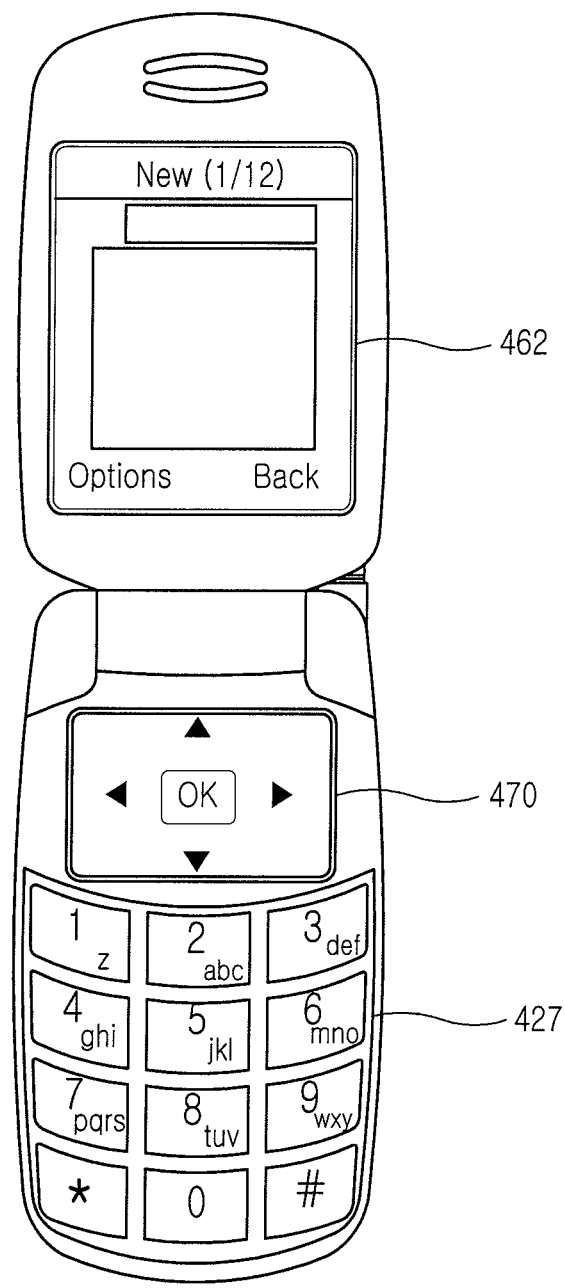

FIG. 5 illustrates a flowchart of a process of controlling a touchscreen in a folder-type wireless terminal according to the second exemplary embodiment of the present invention. FIGS. 6A to 6C describe the process shown in FIG. 5. FIGS. 10A to 10G illustrate icons displayed according to a current mode on the touchscreen unit of the wireless terminal based on the first to third exemplary embodiments of the present invention. FIGS. 11A to 11C illustrate icons indicating the type of occurred event in the wireless terminal based on the first to third exemplary embodiments of the present invention.

An exemplary embodiment of the present invention will be described with reference to FIG. 5 in greater detail.

Referring to FIG. 5, when the wireless terminal is in a folder-close state in step 501, i.e., a stand-by mode of the wireless terminal, the folder sensor 480 detects the folder-close state and outputs, to the control unit 410, a corresponding signal informing a folder-close state of the wireless terminal.

When the corresponding signal informing of the folder-close state is received from the folder sensor 480, the control unit 410 detects the signal in step 502, and proceeds to step 503 to activate the display function of the external display unit 461 as described in FIG. 6A and to control the external display unit 461 to perform a conventional function of a sub-display unit.

When an event, such as a message reception, generation of an alarm or a wireless terminal charge, occurs in step 504, the control unit 410 detects the event and proceeds to step 505 to display an icon indicating the type of the occurred event on the external display unit 461 at a full screen size. The icon displayed in step 505 can be displayed for a period of time, until a user manipulates the icon, or until the event is completed.

In FIGS. 11A to 11C, as described above, an icon indicating a message reception at a full screen size in step 505 is shown in FIG. 11A. An icon indicating generation of an alarm at a full screen size in step 505 is shown in FIG. 11B. An icon indicating a wireless terminal charge at a full screen size in step 505 is shown in FIG. 11C.

In this case, when the wireless terminal is in a folder-open state, the folder sensor 480 detects the folder-open state, and then outputs to the control unit 410 a corresponding signal informing the folder-open state of the wireless terminal.

When the corresponding signal informing the folder-open state is received from the folder sensor 480, the control unit 410 detects the signal in step 506. The control unit 410 proceeds to step 507 to activate the display function of the external display unit 461, to activate the touchscreen function of the touchscreen unit 470 as described in FIG. 6B, and to control an icon for performing a corresponding function at the stand-by mode to be displayed.

In step 507, when the icon is determined to have been set by a user, the control unit 410 controls a stand-by mode icon set by the user to be displayed on the touchscreen 470. When the icon is determined to have not been set by a user, the control unit 410 controls a stand-by mode icon set as a default icon to be displayed on the touchscreen 470.

In step 507, the control unit 410 controls the internal display unit 462 to display either the function performed in correspondence to the touch of the corresponding icon displayed on the touchscreen unit 470 or the function performed in correspondence to the key input from the key input unit 427.

When a specific mode is selected through the icon of the touchscreen unit 470 or the key from the key input unit 427 in step 507, the control unit 410 detects the selection of the specific mode in step 508. In step 508, the control unit 410 determines if a specific mode is selected through the icon of the touchscreen unit 470 or the key from the key input unit 427. Then, in step 509, the control unit 410 converts the mode of the wireless terminal into a specific mode, and controls an icon for performing a corresponding function at the specific mode to be displayed on the touchscreen unit 470.

In step 509, when the icon is determined to have been set by a user, the control unit 410 controls a specific mode icon set by the user to be displayed on the touchscreen 470. When the icon is determined to have not been set by a user, the control unit 410 controls a specific mode icon set as a default icon to be displayed on the touchscreen 470.

FIG. 6C illustrates a specific mode such as a character input mode. In this case, the touchscreen unit 470 displays an icon for performing a corresponding function at the character input mode. The icon displayed on the touchscreen unit 470 at the character input mode may be changed into an icon set by a user and displayed.

In FIGS. 10A to 10G, as described above, when the mode of the wireless terminal corresponds to a photographing mode, an icon displayed on the touchscreen unit 470 in step 509 is shown in FIG. 10A. When the mode of the wireless terminal corresponds to a moving picture photographing mode, an icon displayed on the touchscreen unit 470 in step 509 is shown in FIG. 10B. When the mode of the wireless terminal corresponds to an MP3 playing mode, an icon displayed on the touchscreen unit 470 in step 509 is shown in FIG. 10C. When the mode of the wireless terminal corresponds to a calculator mode, an icon displayed on the touchscreen unit 470 in step 509 is shown in FIG. 10D.

In FIGS. 10A to 10G, as described above, when the mode of the wireless terminal corresponds to a file view mode, an icon displayed on the touchscreen unit 470 in step 509 is shown in FIG. 10E. When the mode of the wireless terminal corresponds to an image editing mode, an icon displayed on the touchscreen unit 470 according to the editing function selected in step 509 is shown in FIG. 10F. When the mode of the wireless terminal corresponds to an FM radio mode, an icon displayed on the touchscreen unit 470 in step 509 is shown in FIG. 10G.

When an event, such as a message reception, generation of an alarm or a wireless terminal charge, occurs in step 509, the control unit 410 detects the event and controls an icon indicating the type of the occurred event to be displayed on at least one of the internal display unit 462 and the touchscreen 470 at a full screen size as described in FIGS. 11A to 11C above. The icon displayed on at least one of the internal display unit 462 and the touchscreen 470 can be displayed for a period of time, until a user manipulates the icon, or until the event is completed.

Figure 7:
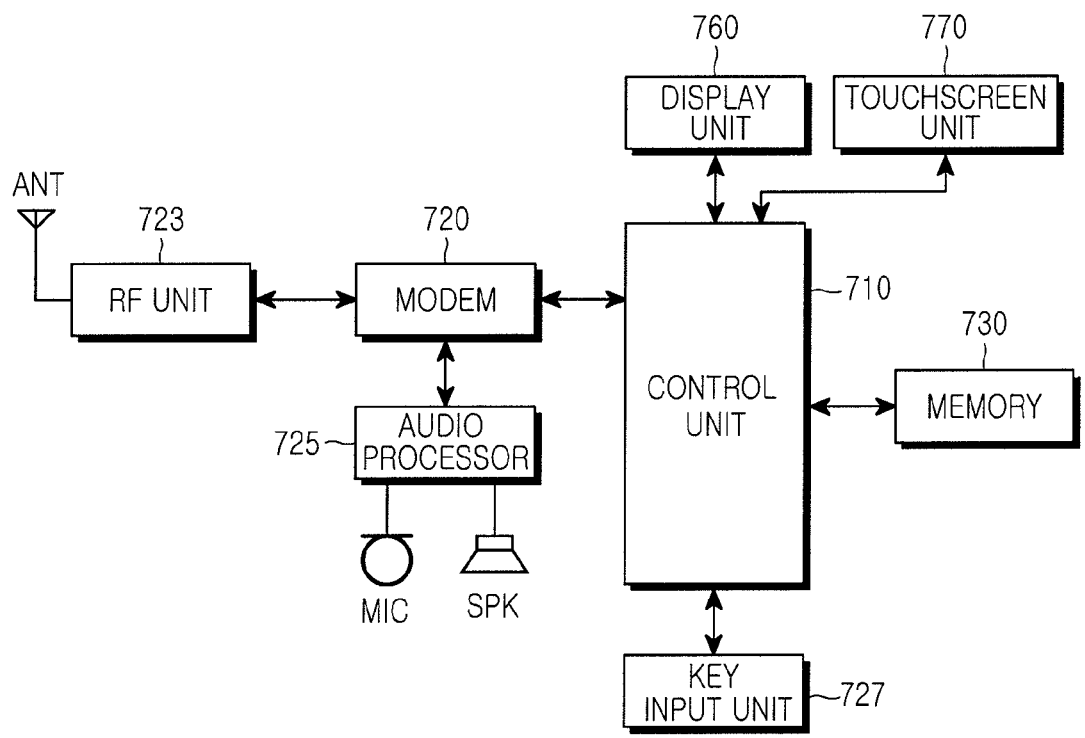
FIG. 7 is a view illustrating a configuration of a bar-type wireless terminal according to a third exemplary embodiment of the present invention.

FIG. 7 illustrates a configuration of a bar-type wireless terminal according to a third exemplary embodiment of the present invention.

In the third exemplary embodiment of the present invention, on the condition that the display unit of the wireless terminal has been deactivated, a predetermined key input for the purpose of activating the display unit represents a first operation state out of operation states of the wireless terminal.

Referring to FIG. 7, an RF unit 723, a modem 720 and an audio processor 725 all perform substantially the same respective operations as the RF unit 123, the modem 120 and the audio processor 125 in FIG. 1.

A memory 730 may include a program memory and a data memory. The program memory can store programs for controlling general operations of the wireless terminal and programs for controlling the function of the touchscreen according to a key input and the current mode of the wireless terminal based on the third exemplary embodiment of the present invention. The data memory performs a function of temporarily storing data generated during performance of the programs.

A control unit 710 performs a function of controlling general operations of the wireless terminal, and may include the modem 720 and a codec.

When a predetermined key is input during a stand-by mode of the wireless terminal according to the third exemplary embodiment of the present invention, the control unit 710 activates the display function of a display unit 760 and the touchscreen function of the touchscreen unit 770. The control init 710 also controls an icon for performing a corresponding function at a current mode to be displayed on the touchscreen unit 770. In this case, the icon, which is displayed on the touchscreen 770, for performing the corresponding function at the stand-by mode may be set by default or set by a user.

When an event occurs at the stand-by mode of the wireless terminal according to the third exemplary embodiment of the present invention, the control unit 710 controls an icon corresponding to the type of the occurred event to be displayed on at least one of the display unit 760 and the touchscreen unit 770 at a full screen size. The event corresponds to generation of an alarm, generation of a wake-up call, a message reception, a wireless terminal charge and the like.

When the stand-by mode of the wireless terminal is converted into a specific mode for execution of a corresponding function according to the third exemplary embodiment of the present invention, the control unit 710 controls an icon for performing a corresponding function at the specific mode to be displayed on the touchscreen unit 770. In this case, the icon displayed on the touchscreen unit 770 in order to perform the corresponding function at the specific mode may be set by default or set by a user.

When an event occurs at the specific mode of the wireless terminal according to the third exemplary embodiment of the present invention, the control unit 710 controls an icon indicating the type of the occurred event to be displayed on at least one of the display unit 760 and the touchscreen unit 770 at a full screen size.

The display unit 760 is disposed on the main body of the wireless terminal, and displays user data output from the control unit 710. When a predetermined key is input at a stand-by mode of the wireless terminal according to the third exemplary embodiment of the present invention, the display unit 760 is activated to display a current mode.

The touchscreen unit 770 is disposed on the main body of the wireless terminal. When a predetermined key is input to the wireless terminal according to the third exemplary embodiment of the present invention, the touchscreen function of the touchscreen unit 770 is activated such that the touchscreen unit 770 displays an icon for performing a corresponding function at the current mode.

A key input unit 727 includes keys for inputting numbers and character information function and keys for setting various functions.

Operations for controlling functions of the touchscreen in such a bar-type wireless terminal will be described with reference to FIG. 8 to 11C in greater detail.

Figure 8:
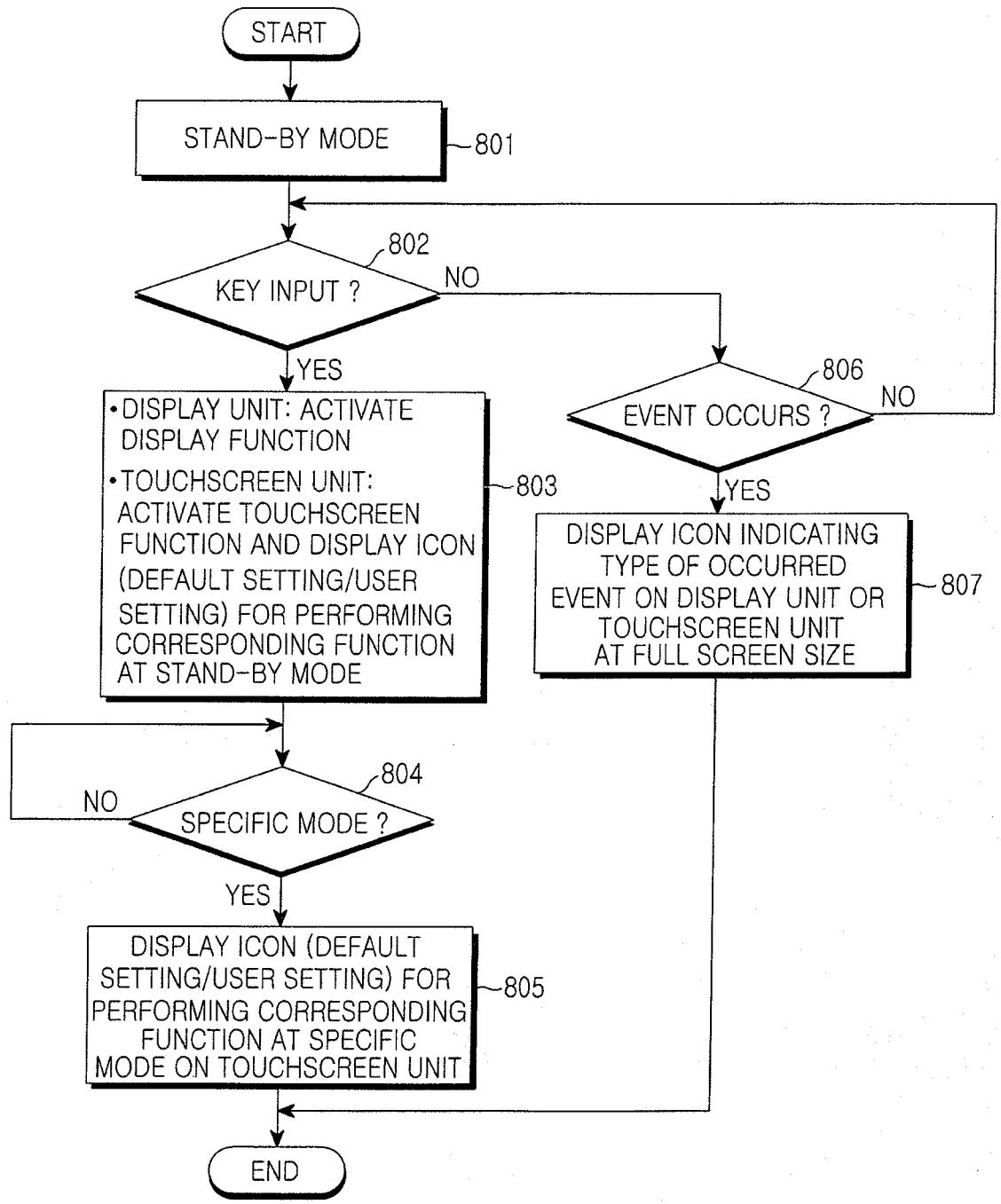
FIG. 8 is a flowchart illustrating a process of controlling a touchscreen in a bar-type wireless terminal according to the third exemplary embodiment of the present invention.
Figure 9A:
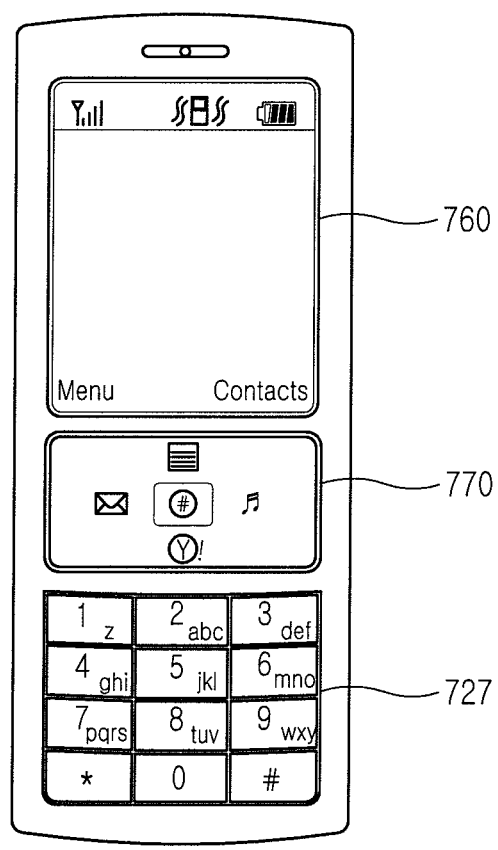
FIGS. 9A and 9B are views for describing the process shown in FIG. 8.
Figure 9B:
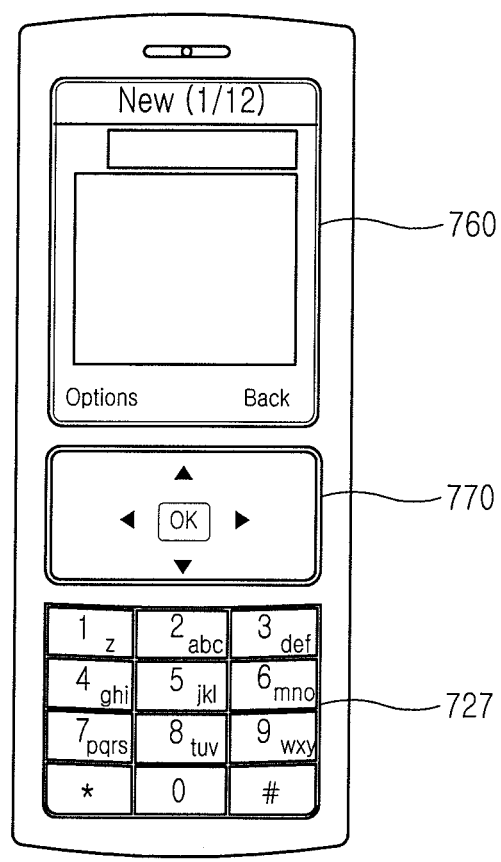

FIG. 8 illustrates a flowchart of a process for controlling a touchscreen in a bar-type wireless terminal according to the third exemplary embodiment of the present invention. FIGS. 9A and 9B describe the process shown in FIG. 8. FIGS. 10A to 10G illustrate an icon displayed according to a current mode on the touchscreen unit of the wireless terminal based on the third exemplary embodiment of the present invention. FIGS. 11A to 11C illustrate an icon indicating the type of occurred event in the wireless terminal according to the third exemplary embodiment of the present invention.

An exemplary embodiment of the present invention will be described with reference to FIG. 8 in greater detail.

Referring to FIG. 8, when a predetermined key is input in step 801, i.e., a stand-by mode of the wireless terminal, the control unit 710 detects the input in step 802 and proceeds to step 803. The stand-by mode of step 801 represents a deactivation state of the display unit 760, which is caused when wireless terminal operations, such as a key operation and occurrence of an event and the like, do not occur for a period of time.

In step 803, as described in FIG. 9A, the control unit 710 activates the display function of the display unit 760 and the touchscreen function of the touchscreen unit 770, and then controls an icon for performing a corresponding function at the stand-by mode to be displayed.

In step 803, when the icon is determined to have been set by a user, the control unit 710 controls a stand-by mode icon set by the user to be displayed on the touchscreen unit 770. When the icon is determined to have not been set by a user, the control unit 710 controls a stand-by mode icon set as a default icon to be displayed on the touchscreen unit 770.

In step 803, the control unit 710 controls the display unit 760 to display either the function performed in response to a touch on the corresponding icon displayed on the touchscreen unit 770 or the function performed in response to the key input from the key input unit 727.

When a specific mode is selected through the icon selection of the touchscreen unit 770 or a predetermined key input from the key input unit 727 in step 803, the control unit 710 detects the selection of the specific mode in step 804, and determines if a specific mode is selected through the icon selection of the touchscreen unit 770 or the key from the key input unit 727. Then, in step 805, the control unit 710 converts the mode of the wireless terminal into the specific mode and controls an icon for performing a corresponding function at the specific mode to be displayed on the touchscreen unit 770.

In step 805, when the icon is determined to have been set by a user, the control unit 710 controls a stand-by mode icon set by the user to be displayed on the touchscreen unit 770. When the icon is determined to have not been set by a user, the control unit 710 controls a stand-by mode icon set as a default icon to be displayed on the touchscreen unit 770.

FIG. 9B illustrates a specific mode, such as a character input mode. In this case, the touchscreen unit 770 displays an icon for performing a corresponding function at the character input mode. The icon displayed on the touchscreen unit 770 at the character input mode may be changed into an icon set by a user and displayed.

In FIGS. 10A to 10G, as described above, when the mode of the wireless terminal corresponds to a photographing mode, an icon displayed on the touchscreen unit 770 in step 805 is shown in FIG. 10A. When the mode of the wireless terminal corresponds to a moving picture photographing mode, an icon displayed on the touchscreen unit 770 in step 805 is shown in FIG. 10B. When the mode of the wireless terminal corresponds to an MP3 playing mode, an icon displayed on the touchscreen unit 770 in step 805 is shown in FIG. 10C. When the mode of the wireless terminal corresponds to a calculator mode, an icon displayed on the touchscreen unit 770 in step 805 is shown in FIG. 10D.

In FIGS. 10A to 10G, as described above, when the mode of the wireless terminal corresponds to a file view mode, an icon displayed on the touchscreen unit 770 in step 805 is shown in FIG. 10E. When the mode of the wireless terminal corresponds to an image editing mode, an icon displayed on the touchscreen unit 770 according to the editing function selected in step 805 is shown in FIG. 10F. When the mode of the wireless terminal corresponds to an FM radio mode, an icon displayed on the touchscreen unit 770 in step 805 is shown in FIG. 10G.

When an event, such as a message reception, generation of an alarm or a wireless terminal charge occurs at a stand-by mode of step 801, the control unit 710 detects the event in step 806, and proceeds to step 807 to activate at least one of the display unit 760 and the touchscreen 770 and control an icon indicating the type of the occurred event to be displayed at a full screen size. The icon displayed in step 807 can be displayed for a period of time, until a user manipulates the icon, or until the event is completed.

In FIGS. 11A to 11C above, an icon indicating a message reception at a full screen size in step 807 is shown in FIG. 11A. An icon indicating generation of an alarm at a full screen size in step 807 is shown in FIG. 11B. An icon indicating a wireless terminal charge at a full screen size in step 807 is shown in FIG. 11C.

As described above, according to the control of a touchscreen unit based on the operation state of a wireless terminal, exemplary embodiments of the present invention have an effect that they can provide a user of a current mode with greater convenience by means of controlling an icon for performing a corresponding function at the current mode to be displayed on the touchscreen unit according to a basic setting or a user setting when a slide-type wireless terminal is in a slide-up state or a folder-type wireless terminal is in a folder-open state or a predetermined key is input to a bar-type wireless terminal.

Additionally, the present invention can reduce the power consumption of a slide-type wireless terminal by using the touchscreen unit as a sub-display unit when a slide-type wireless terminal is in a slide-down state.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

As described above, an exemplary embodiment such as a wireless terminal has been described in the present invention. While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling a touchscreen in a wireless terminal, the apparatus comprising:
   a display unit configured to display images generated during performing a function in a standby mode or a specific mode;
   a touch screen unit configured to display standby-mode icons used to perform associated functions in the standby mode, and to display specific-mode icons used to perform associated functions in the specific mode when the mobile terminal switches from the standby mode to the specific mode; and
   a control unit configured to control the touch screen unit to display the standby-mode icons on the touch screen when the mobile terminal switches to the standby mode as the mobile terminal is in a first operation state, and to display the specific-mode icons on the touch screen when the mobile terminal switches to the specific mode as a specific icon is selected among the standby-mode icons.

2. The apparatus of claim 1, wherein the first operation state comprises at least one of a slide-up state of a slide-type wireless terminal, a folder-open state of a folder-type wireless terminal and a key input state of a bar-type wireless terminal 3. The apparatus of claim 1, wherein, when an event occurs in the first operation state of the wireless terminal, the control unit controls an icon indicating a type of the occurred event to be displayed on at least one of the display unit and the touchscreen unit at a full screen size.

4. The apparatus of claim 1, wherein, when the wireless terminal is in a second operation state contrary to the first operation state, the control unit deactivates the display unit, and controls a function of the touchscreen unit to be converted into a function of the display unit.

5. The apparatus of claim 4, wherein the second operation state comprises at least one of a slide-down state of a slide-type wireless terminal and a folder-close state of a folder-type wireless terminal 6. The apparatus of claim 4, wherein, when an event occurs in the second operation state of the wireless terminal, the control unit controls an icon indicating a type of the occurred event to be displayed on the touchscreen unit at a full screen size.

7. The apparatus of claim 1, wherein the icon is set by at least one of default and a user for performing a corresponding function at the stand-by mode or the specific mode.

8. The apparatus of claim 1, wherein if the wireless terminal is a slide-type terminal,
   the control unit is configured to control the touch screen unit to display the standby-mode icons on the touch screen when the mobile terminal switches to the standby mode as the mobile terminal is in a slide-up state, and to display the specific-mode icons on the touch screen when the mobile terminal switches to the specific mode as a specific icon is selected from among the standby-mode icons.

9. The apparatus of claim 8, wherein the control unit controls an icon indicating a type of an occurred event to be displayed on the touchscreen unit at a full screen size when the wireless terminal is in a slide-down state, and controls the icon to be displayed on at least one of the display unit and the touchscreen unit at a full screen size when the wireless terminal is in a slide-up state.

10. The apparatus of claim 1, wherein if the wireless terminal is a folder-type terminal,
   the control unit is configured to control the touch screen unit to display the standby-mode icons on the touch screen when the mobile terminal switches to the standby mode as the mobile terminal is in a folder-open state, and to display the specific-mode icons on the touch screen when the mobile terminal switches to the specific mode as a specific icon is selected from among the standby-mode icons.

11. The apparatus of claim 10, wherein the control unit controls an icon indicating a type of an occurred event to be displayed on the external display unit at a full screen size when the wireless terminal is in a folder-close state, and controls the icon to be displayed on at least one of the internal display unit and the touchscreen unit at a full screen size when the wireless terminal is in a folder-open state.

12. The apparatus of claim 1, wherein if the wireless terminal is a bar-type terminal,
   the control unit is configured to control the touch screen unit to display the standby-mode icons on the touch screen when the mobile terminal switches to the standby mode as a key is input, and to display the specific-mode icons on the touch screen when the mobile terminal switches to the specific mode as a specific icon is selected from among the standby-mode icons.

13. The apparatus of claim 12, wherein the control unit controls an icon indicating a type of an occurred event to be displayed on at least one of the display unit and the touchscreen unit at a full screen size.

14. A method for controlling a touchscreen in a wireless terminal, the method comprising:
- if the mobile terminal enters a first operation state, switching to a standby mode, and displaying, on the touch screen, standby-mode icons used to perform associated functions in the standby mode; and
- displaying, on the touch screen, specific-mode icons used to perform associated functions in a specific mode, if the mobile terminal switches to the specific mode as a specific icon is selected from among the standby-mode icons.

15. The method of claim 14, wherein the first operation state comprises at least one of a slide-up or a slide-down state of a slide-type wireless terminal, a folder-open or a folder-close state of a folder-type wireless terminal, and a key input state of a bar-type wireless terminal 16. The method of claim 14, further comprising displaying an icon indicating a type of the occurred event on at least one of the touchscreen unit and the display unit at a full screen size when an event occurs in the wireless terminal 17. The method of claim 14, wherein the icon is set by at least one of default and a user for performing a corresponding function at the stand-by mode or the specific mode.

18. The method of claim 14, further comprising, if the wireless terminal is a slide-type terminal:
- converting a function of the touchscreen unit into a function of the display unit when the wireless terminal is in a slide-down state;
- changing and displaying a type of icon for performing a corresponding function according to a type of current mode on the touchscreen unit when the wireless terminal is in a slide-up state;
- if the mobile terminal is in a slide-up state, switching to a standby mode, and displaying, on the touch screen, standby-mode icons used to perform associated functions in the standby mode; and
- displaying, on the touch screen, specific-mode icons used to perform associated functions in a specific mode, if the mobile terminal switches to the specific mode as a specific icon is selected from among the standby-mode icons.

19. The method of claim 18, further comprising:
- determining whether the wireless terminal is in a slide-up state or in a slide-down state when an event occurs in the wireless terminal;
- displaying an icon indicating a type of the occurred event on the touchscreen unit at full screen size when the wireless terminal is in a slide-down state; and
- displaying an icon indicating a type of the occurred event on at least one of the display unit and the touchscreen unit at full screen size when the wireless terminal is in a slide-up state.

20. The method of claim 14, further comprising, if the wireless terminal is a folder-type terminal:
- if the mobile terminal is in a folder-open state, switching to a standby mode, and displaying, on the touch screen, standby-mode icons used to perform associated functions in the standby mode; and
- displaying, on the touch screen, specific-mode icons used to perform associated functions in a specific mode, if the mobile terminal switches to the specific mode as a specific icon is selected from among the standby-mode icons.

21. The method of claim 20, further comprising:
- determining whether the wireless terminal is in a folder-open state or in a folder-close state when an event occurs in the wireless terminal;
- displaying an icon indicating a type of the occurred event on the external display unit at a full screen size when the wireless terminal is in a folder-close state; and
- displaying an icon indicating a type of the occurred event on at least one of the internal display unit and the touchscreen unit at full screen size when the wireless terminal is in a folder-open state.

22. The method of claim 14, further comprising, if the wireless terminal is a bar-type terminal:
- determining whether a key is input to the wireless terminal;
- changing and displaying a type of icon for performing a corresponding function according to a type of current mode on a touchscreen unit when the key is input;
- if the key is input, switching to a standby mode, and displaying, on the touch screen, standby-mode icons used to perform associated functions in the standby mode; and
- displaying, on the touch screen, specific-mode icons used to perform associated functions in a specific mode, if the mobile terminal switches to the specific mode as a specific icon is selected from among the standby-mode icons.

23. The method of claim 22, further comprising displaying an icon indicating a type of the occurred event on at least one of the display unit and the touchscreen unit at full screen size when an event occurs in the wireless terminal.

* * * * *